United States Patent
Hua et al.

(10) Patent No.: US 11,438,904 B2
(45) Date of Patent: Sep. 6, 2022

(54) METHOD FOR DOWNLINK AGGREGATION CONFIGURATION USING TRANSMISSION TIME UNITS

(71) Applicant: HUAWEI TECHNOLOGIES CO., LTD., Guangdong (CN)

(72) Inventors: Meng Hua, Shanghai (CN); Junchao Li, Shanghai (CN); Shurong Jiao, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 99 days.

(21) Appl. No.: 17/014,401

(22) Filed: Sep. 8, 2020

(65) Prior Publication Data
US 2020/0404677 A1    Dec. 24, 2020

Related U.S. Application Data

(63) Continuation of application No. PCT/CN2018/082049, filed on Apr. 4, 2018.

(51) Int. Cl.
*H04J 3/00*     (2006.01)
*H04W 72/08*    (2009.01)
*H04W 72/04*    (2009.01)

(52) U.S. Cl.
CPC ....... *H04W 72/082* (2013.01); *H04W 72/042* (2013.01); *H04W 72/0446* (2013.01)

(58) Field of Classification Search
CPC ............. H04W 72/082; H04W 72/042; H04W 72/0446
See application file for complete search history.

(56) References Cited

U.S. PATENT DOCUMENTS

2017/0295601 A1* 10/2017 Kim .................. H04L 5/0092
2018/0069618 A1*  3/2018 Loehr ............... H04W 72/1263
(Continued)

FOREIGN PATENT DOCUMENTS

CN    103179672 A    6/2013
CN    104904259 A    9/2015
(Continued)

OTHER PUBLICATIONS

Office Action issued in Chinese Application No. 201880088956.8 dated Apr. 2, 2021, 17 pages (with English translation).
(Continued)

*Primary Examiner* — Abdelnabi O Musa
(74) *Attorney, Agent, or Firm* — Fish & Richardson P.C.

(57) ABSTRACT

This application provides wireless communication methods, apparatuses, and systems. One method comprises: receiving higher layer signaling from a base station, wherein the higher layer signaling indicates a downlink aggregation coefficient S corresponding to S consecutive transmission time units, and a transport block is repeatedly transmitted at each of the S consecutive transmission time units; receiving physical layer signaling from the base station, wherein the physical layer signaling schedules the transport block and comprises first indication information indicating at least a portion of resource of a downlink control region available for transmitting the transport block; and determining a valid
(Continued)

time of the first indication information, wherein the valid time is one or more transmission time units in the S consecutive transmission time units.

20 Claims, 6 Drawing Sheets

(56) References Cited

U.S. PATENT DOCUMENTS

| | | | | |
|---|---|---|---|---|
| 2019/0007181 | A1* | 1/2019 | Marinier | H04L 5/0091 |
| 2019/0149365 | A1* | 5/2019 | Chatterjee | H04L 5/0044 |
| | | | | 370/329 |
| 2019/0150176 | A1* | 5/2019 | Pelletier | H04W 72/0453 |
| | | | | 370/329 |
| 2019/0174513 | A1* | 6/2019 | Loehr | H04W 72/1268 |
| 2019/0182639 | A1* | 6/2019 | Basu Mallick | H04W 72/042 |
| 2019/0199481 | A1* | 6/2019 | Hosseini | H04L 1/0038 |

FOREIGN PATENT DOCUMENTS

| | | |
|---|---|---|
| CN | 106031062 A | 10/2016 |
| WO | 2018031623 A1 | 2/2018 |

OTHER PUBLICATIONS

3GPP TS 38.214 V15.0.0 (Dec. 2017), "3rd Generation Partnership Project; Technical Specification Group Radio Access Network; NR; Physical layer procedures for data (Release 15)," Dec. 2017, 71 pages.

3GPP TS 38.214 V15.1.0 (Mar. 2018), "3rd Generation Partnership Project; Technical Specification Group Radio Access Network; NR; Physical layer procedures for data (Release 15)," Mar. 2018, 77 pages.

PCT International Search Report and Written Opinion issued in International Application No. PCT/CN2018/082049 dated Dec. 6, 2018, 11 pages (partial English translation).

Huawei, HiSilicon, "Draft CR on resource allocation in TS38.214," 3GPP TSG RAN WG1 Meeting #92, R1-1802706, Athens, Greece, Feb. 26-Mar. 2, 2018, 7 pages.

Nokia, Nokia Shanghai Bell, "Implementation of the minimum PxSCH duration agreements," 3GPP TSG RAN WG1 Meeting #92, R1-1803448, Athens, Greece, Feb. 26-Mar. 2, 2018, 3 pages.

Extended European Search Report in European Application No. 18913706.0, dated Jan. 11, 2021, 10 pages.

* cited by examiner

METHOD FOR DOWNLINK AGGREGATION CONFIGURATION USING TRANSMISSION TIME UNITS

CROSS-REFERENCE TO RELATED APPLICATIONS

This application is a continuation of International Application No. PCT/CN2018/082049, filed on Apr. 4, 2018, the disclosure of which is hereby incorporated by reference in its entirety.

TECHNICAL FIELD

This application relates to the field of communication technologies, and in particular, to a wireless communication method, apparatus, and system.

BACKGROUND

The technical specification (TS) of the 3rd generation partnership project (3GPP), for example, a protocol in 38.214v15.0.1 defines a scheduling manner of slot aggregation. A base station may send higher layer signaling to a terminal, so that each of a plurality of consecutive slots of downlink resources is used to repeatedly send a same transport block (TB). In addition, to improve utilization of the downlink resources, it is further defined in the 3GPP protocol that physical layer signaling is used to indicate to the terminal that a part of physical downlink control channel (PDCCH for short) resource may be used to transmit a physical downlink shared channel (PDSCH for short).

However, the part of PDCCH resource that may be used to transmit the PDSCH may still be used to transmit a PDCCH in an existing solution. As a result, PDCCH transmission and PDSCH transmission both exist on a same PDCCH resource. Because the PDCCH and the PDSCH interfere with each other, performance of a communications system is degraded.

SUMMARY

With reference to a plurality of implementations, this application provides a wireless communication method, apparatus, and system, to improve performance of a communications system.

According to a first aspect, a wireless communications apparatus is provided and includes:

a receiving unit, configured to receive higher layer signaling from a base station, where the higher layer signaling is used to indicate a downlink aggregation coefficient S, S is an integer greater than 1, the downlink aggregation coefficient S corresponds to S consecutive transmission time units, and each transmission time unit is used to repeatedly transmit a transport block of a terminal; where the receiving unit is further configured to receive physical layer signaling from the base station, where the physical layer signaling is used to schedule the transport block of the terminal and includes first indication information, and the first indication information is used to indicate that a part of resource of a downlink control region can be used to transmit the transport block of the terminal; and a processing unit, configured to determine a valid time of the first indication information, where the valid time is one or more transmission time units in the S consecutive transmission time units.

It should be understood that the part of resource of the downlink control region can be used to transmit the transport block of the terminal within the valid time. The part of resource of the downlink control region cannot be used to transmit the transport block of the terminal beyond the valid time. Therefore, the valid time of the first indication information is introduced in this application, so that use of the part of resource of the downlink control region can be determined. In this way, a probability of mutual interference between a transport block and downlink control information is reduced, thereby improving performance of a communications system.

It should be understood that the wireless communications apparatus may be a terminal, or the wireless communications apparatus may be a chip or a chip set applied to a terminal. The chip or the chip set may be a system-on-chip (SoC) chip or a baseband chip. The baseband chip is sometimes referred to as a modem.

The receiving unit and the processing unit may be implemented by using software code, or may be implemented by using a hardware circuit, or may be implemented by using a combination of software code and a hardware circuit. For example, when the wireless communications apparatus is a terminal, the receiving unit may be a receiver or a transceiver, and the processing unit may be a processor; or when the wireless communications apparatus is a chip or a chip set, the receiving unit may be an input interface or an input pin of the chip, and the processing unit may be a central processing unit (CPU). For another example, the receiving unit may be a segment of program code used to implement a receiving function, and the processing unit may be another segment of program code used to implement a processing function.

In an embodiment of the first aspect of this application, the determining a valid time of the first indication information includes:

determining that the valid time of the first indication information is a first transmission time unit in the S consecutive transmission time units by default.

In an embodiment of the first aspect of this application, the determining a valid time of the first indication information includes:

determining the valid time of the first indication information according to a correspondence between the downlink aggregation coefficient S and the valid time of the first indication information, where the correspondence is predefined in a protocol.

In an embodiment of the first aspect of this application, the determining a valid time of the first indication information includes:

receiving second indication information from the base station, where the second indication information is used to indicate the valid time of the first indication information.

In an embodiment of the first aspect of this application, the second indication information is carried in the higher layer signaling, and the higher layer signaling is a configuration message of a physical downlink control channel.

In an embodiment of the first aspect of this application, the second indication information is carried in the physical layer signaling, and the physical layer signaling is downlink control information.

In an embodiment of the first aspect of this application, a size of the transmission time unit is one slot, and the slot includes 14 symbols.

In an embodiment of the first aspect of this application, a size of the transmission time unit is M symbols, and M is an integer greater than 1 and less than 14.

In an embodiment of the first aspect of this application, the determining a valid time of the first indication information includes: determining that the valid time of the first indication information is the S consecutive transmission time units by default.

In an embodiment of the first aspect of this application, the determining a valid time of the first indication information includes:

determining that the valid time of the first indication information is the S consecutive transmission time units when a value of M is less than a preset threshold.

In an embodiment of the first aspect of this application, the determining a valid time of the first indication information includes:

determining that the valid time of the first indication information is a first transmission time unit in the S consecutive transmission time units if a value of M is greater than a preset threshold.

In an embodiment of the first aspect of this application, the determining a valid time of the first indication information includes:

determining a maximum valid time K according to a correspondence between M and the maximum valid time K, where the correspondence between M and K is predefined in a protocol, and the valid time of the first indication information is first min(K. S) transmission time units in the S transmission time units, and min(K, S) represents a smaller value in K and S.

In conclusion, the terminal can determine specific transmission time units in which the first indication information included in the physical layer signaling is valid, where the specific transmission time units are in the S transmission time units that are indicated by using the higher layer signaling in a slot aggregation scenario. In this way, the following case can be avoided: The part of PDCCH resource that may be used to transmit the PDSCH may still be used to transmit the PDCCH in an existing solution. To implement the foregoing purpose, the wireless communications apparatus provided in the first aspect of this application determines that one or more transmission time units in the S consecutive transmission time units in the slot aggregation scenario are the valid time of the first indication information. In other words, in the one or more transmission time units determined by the terminal, the part of resource of the downlink control region can be used to transmit the transport block of the terminal. Therefore, the valid time of the first indication information is introduced, so that use of the part of resource of the downlink control region can be determined. In this way, a probability of mutual interference between a transport block and downlink control information is reduced, thereby improving performance of a communications system.

According to a second aspect, a wireless communication method is provided and includes:

receiving higher layer signaling from a base station, where the higher layer signaling is used to indicate a downlink aggregation coefficient S, S is an integer greater than 1, the downlink aggregation coefficient S corresponds to S consecutive transmission time units, and each transmission time unit is used to repeatedly transmit a transport block of a terminal;

receiving physical layer signaling from the base station, where the physical layer signaling is used to schedule the transport block of the terminal and includes first indication information, and the first indication information is used to indicate that a part of resource of a downlink control region can be used to transmit the transport block of the terminal; and determining a valid time of the first indication information, where the valid time is one or more transmission time units in the S consecutive transmission time units.

In an embodiment of the second aspect of this application, the determining a valid time of the first indication information includes: determining that the valid time of the first indication information is a first transmission time unit in the S consecutive transmission time units by default.

In an embodiment of the second aspect of this application, the determining a valid time of the first indication information includes:

determining the valid time of the first indication information according to a correspondence between the downlink aggregation coefficient S and the valid time of the first indication information, where the correspondence is predefined in a protocol.

In an embodiment of the second aspect of this application, the determining a valid time of the first indication information includes:

receiving second indication information from the base station, where the second indication information is used to indicate the valid time of the first indication information.

In an embodiment of the second aspect of this application, the second indication information is carried in the higher layer signaling, and the higher layer signaling is a configuration message of a physical downlink control channel.

In an embodiment of the second aspect of this application, the second indication information is carried in the physical layer signaling, and the physical layer signaling is downlink control information.

In an embodiment of the second aspect of this application, a size of the transmission time unit is one slot, and the slot includes 14 symbols.

In an embodiment of the second aspect of this application, a size of the transmission time unit is M symbols, and M is an integer greater than 1 and less than 14.

In an embodiment of the second aspect of this application, the determining a valid time of the first indication information includes:

determining that the valid time of the first indication information is the S consecutive transmission time units by default.

In an embodiment of the second aspect of this application, the determining a valid time of the first indication information includes:

determining that the valid time of the first indication information is the S consecutive transmission time units when a value of M is less than a preset threshold.

In an embodiment of the second aspect of this application, the determining a valid time of the first indication information includes:

determining that the valid time of the first indication information is a first transmission time unit in the S consecutive transmission time units if a value of M is greater than a preset threshold.

In an embodiment of the second aspect of this application, the determining a valid time of the first indication information includes:

determining a maximum valid time K according to a correspondence between M and the maximum valid time K, where the correspondence between M and K is predefined in a protocol, and the valid time of the first indication information is first min(K, S) transmission time units in the S transmission time units, and min(K, S) represents a smaller value in K and S.

In conclusion, the terminal can determine specific transmission time units in which the first indication information included in the physical layer signaling is valid, where the specific transmission time units are in the S transmission time units that are indicated by using the higher layer signaling in a slot aggregation scenario. In this way, the following case can be avoided: The part of PDCCH resource that may be used to transmit the PDSCH may still be used to transmit the PDCCH in an existing solution. To implement the foregoing purpose, in the wireless communication method provided in the second aspect of this application, it is determined that one or more transmission time units in the S consecutive transmission time units in the slot aggregation scenario are the valid time of the first indication information. In other words, in the one or more transmission time units determined by the terminal, the part of resource of the downlink control region can be used to transmit the transport block of the terminal. Therefore, the valid time of the first indication information is introduced, so that use of the part of resource of the downlink control region can be determined. In this way, a probability of mutual interference between a transport block and downlink control information is reduced, thereby improving performance of a communications system.

According to a third aspect, a wireless communications apparatus is provided and includes:

a sending unit, where the sending unit is configured to send higher layer signaling to a terminal, where the higher layer signaling is used to indicate a downlink aggregation coefficient S, S is an integer greater than 1, the downlink aggregation coefficient S corresponds to S consecutive transmission time units, and each transmission time unit is used to repeatedly transmit a transport block of the terminal; where the sending unit is further configured to send physical layer signaling to the terminal, where the physical layer signaling is used to schedule the transport block of the terminal and includes first indication information, and the first indication information is used to indicate that a part of resource of a downlink control region can be used to transmit the transport block of the terminal; and the sending unit is further configured to send second indication information to the terminal, where the second indication information is used to indicate a valid time of the first indication information, and the valid time is one or more transmission time units in the S consecutive transmission time units.

In an embodiment of the third aspect of this application, the second indication information is carried in the higher layer signaling, and the higher layer signaling is a configuration message of a physical downlink control channel.

In an embodiment of the third aspect of this application, the second indication information is carried in the physical layer signaling, and the physical layer signaling is downlink control information.

In an embodiment of the third aspect of this application, a size of the transmission time unit is one slot, and the slot includes 14 symbols.

In an embodiment of the third aspect of this application, a size of the transmission time unit is M symbols, and M is an integer greater than 1 and less than 14.

According to the wireless communications apparatus provided in the third aspect of this application, a base station indicates the valid time of the first indication information of the terminal by using the second indication information sent to the terminal, so that the terminal determines, according to the second indication information, that the one or more transmission time units in the S consecutive transmission time units in a slot aggregation scenario are the valid time of the first indication information. In other words, in the one or more transmission time units determined by the terminal, the part of resource of the downlink control region can be used to transmit the transport block of the terminal. Therefore, the valid time of the first indication information is introduced, so that use of the part of resource of the downlink control region can be determined. In this way, a probability of mutual interference between a transport block and downlink control information is reduced, thereby improving performance of a communications system.

According to a fourth aspect, a wireless communication method is provided and includes:

sending higher layer signaling to a terminal, where the higher layer signaling is used to indicate a downlink aggregation coefficient S, S is an integer greater than 1, the downlink aggregation coefficient S corresponds to S consecutive transmission time units, and each transmission time unit is used to repeatedly transmit a transport block of the terminal;

sending physical layer signaling to the terminal, where the physical layer signaling is used to schedule the transport block of the terminal and includes first indication information, and the first indication information is used to indicate that a part of resource of a downlink control region can be used to transmit the transport block of the terminal; and sending second indication information to the terminal, where the second indication information is used to indicate a valid time of the first indication information, and the valid time is one or more transmission time units in the S consecutive transmission time units.

In an embodiment of the fourth aspect of this application, the second indication information is carried in the higher layer signaling, and the higher layer signaling is a configuration message of a physical downlink control channel.

In an embodiment of the fourth aspect of this application, the second indication information is carried in the physical layer signaling, and the physical layer signaling is downlink control information.

In an embodiment of the fourth aspect of this application, a size of the transmission time unit is one slot, and the slot includes 14 symbols.

In an embodiment of the fourth aspect of this application, a size of the transmission time unit is M symbols, and M is an integer greater than 1 and less than 14.

In the wireless communication method provided in the fourth aspect of this application, a base station indicates the valid time of the first indication information of the terminal by using the second indication information sent to the terminal, so that the terminal determines, according to the second indication information, that the one or more transmission time units in the S consecutive transmission time units in a slot aggregation scenario are the valid time of the first indication information. In other words, in the one or more transmission time units determined by the terminal, the part of resource of the downlink control region can be used to transmit the transport block of the terminal. Therefore, the valid time of the first indication information is introduced, so that use of the part of resource of the downlink control region can be determined. In this way, a probability of mutual interference between a transport block and downlink control information is reduced, thereby improving performance of a communications system.

According to a fifth aspect, a wireless communications apparatus is provided. The wireless communications apparatus includes a memory, a processor, and a computer program that is stored in the memory and that can be run on the processor. When the processor runs the computer program, the wireless communications apparatus is enabled to perform the method according to any one of the foregoing embodiments.

According to a sixth aspect, a computer-readable storage medium is provided. The computer-readable storage medium stores computer code. When a processor executes the computer code, the method according to any one of the foregoing embodiments is implemented.

According to a seventh aspect, a computer program product is provided. When a processor executes program code included in the computer program product, the method according to any one of the foregoing embodiments is implemented.

According to an eighth aspect, a wireless communications system is provided, including the wireless communications apparatus according to any one of the first aspect and the foregoing embodiments and the wireless communications apparatus according to any one of the third aspect and the foregoing embodiments. Optionally, the wireless communications apparatus according to the first aspect and the foregoing embodiments is a terminal, and the wireless communications apparatus according to the third aspect and the foregoing embodiments is a base station.

In conclusion, according to the wireless communication method, and the wireless communications apparatus and system provided in this application, the valid time of the first indication information is introduced, so that use of the part of resource of the downlink control region can be determined. In this way, a probability of mutual interference between a transport block and downlink control information is reduced, thereby improving performance of a communications system.

DESCRIPTION OF EMBODIMENTS

Figure 1:
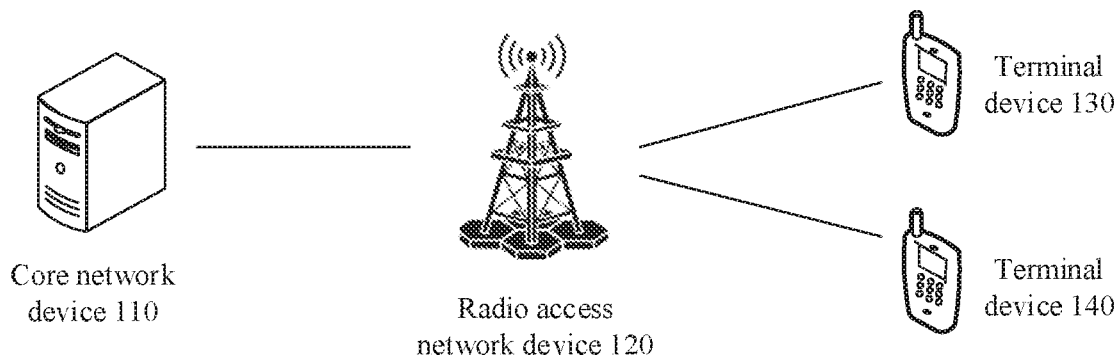
FIG. 1 is a schematic architectural diagram of a mobile communications system to which an embodiment of this application is applied.

FIG. 1 is a schematic architectural diagram of a mobile communications system to which an embodiment of this application is applied. As shown in FIG. 1, the mobile communications system includes a core network device 110, a radio access network device 120, and at least one terminal device (for example, a terminal device 130 and a terminal device 140 in FIG. 1). The terminal device is connected to the radio access network device in a wireless manner, and the radio access network device is connected to the core network device in a wireless or wired manner. The core network device and the radio access network device may be different physical devices that are independent of each other, or a function of the core network device and a logical function of the radio access network device may be integrated into a same physical device, or some functions of the core network device and some functions of the radio access network device may be integrated into one physical device. The terminal device may be at a fixed location or may be mobile. FIG. 1 is merely a schematic diagram. The communications system may further include other network devices, for example, may further include a wireless relay device and a wireless backhaul device that are not drawn in FIG. 1. Quantities of core network devices, radio access network devices, and terminal devices that are included in the mobile communications system are not limited in this embodiment of this application.

The radio access network device is an access device that is used by the terminal device to access the mobile communications system in a wireless manner. The radio access network device may be a base station NodeB, an evolved NodeB eNodeB, a gNodeB in a 5G mobile communications system, a NodeB in a future mobile communications system, an access node in a Wi-Fi system, or the like. This embodiment of this application imposes no limitation on a specific technology used by the radio access network device and a specific device form of the radio access network device.

The terminal device may also be referred to as a terminal, user equipment (UE), a mobile station (MS), a mobile terminal (MT), or the like. The terminal device may be a mobile phone, a tablet computer (Pad), a computer with a wireless sending/receiving function, a virtual reality (VR) terminal device, an augmented reality (AR) terminal device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, or the like.

The radio access network device and the terminal device may be deployed on land, including indoor or outdoor, or handheld or in-vehicle; or may be deployed on the water; or may be deployed on an airplane, a balloon, or a satellite in the air. An application scenario of the radio access network device and the terminal device is not limited in this embodiment of this application.

This embodiment of this application is applicable to downlink signal transmission, is also applicable to uplink signal transmission, and is further applicable to device-to-device (D2D) signal transmission. For the downlink signal transmission, a sending device is the radio access network device, and a corresponding receiving device is the terminal device. For the uplink signal transmission, a sending device is the terminal device, and a corresponding receiving device is the radio access network device. For the D2D signal transmission, a sending device is a terminal device, and a corresponding receiving device is also a terminal device. A signal transmission direction is not limited in this embodiment of this application.

Communication between the radio access network device and the terminal device and communication between terminal devices may be performed by using a licensed spectrum, or may be performed by using an unlicensed spectrum, or may be performed by using both a licensed spectrum and an unlicensed spectrum. The communication between the radio access network device and the terminal device and the communication between terminal devices may be performed by using a spectrum below 6 GHz, or may be performed by using a spectrum above 6 GHz, or may be performed by using both a spectrum below 6 GHz and a spectrum above 6 GHz. A spectrum resource used for the radio access network device and the terminal device is not limited in this embodiment of this application.

Figure 2:
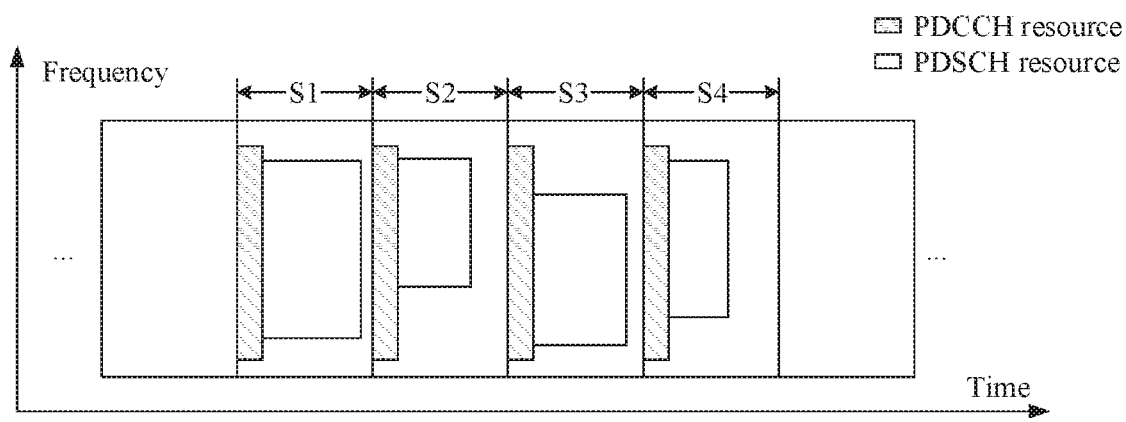
FIG. 2 is a schematic structural diagram of a transmission time unit of a terminal according to this application.

FIG. 2 is a schematic structural diagram of a transmission time unit of a terminal according to this application. As shown in FIG. 2, in transmission time units of downlink resources of the terminal that are arranged according to time on the lateral axis and frequency on the longitude axis, a slot is a basic composition unit, and each slot includes both a time-frequency resource used to transmit a PDCCH and a time-frequency resource used to transmit a PDSCH. From a perspective of time on the lateral axis, a PDCCH resource in each slot is located at a start moment of the slot, and a PDSCH resource in each slot is located after an end moment of the PDCCH resource. In addition, as shown in FIG. 2, a PDCCH time domain resource and a PDCCH frequency domain resource in each slot are relatively fixed. A transport block of the terminal may be transmitted on the PDSCH resource in each slot. Transport blocks are transmitted by using different symbol sets (Symbol Allocation). In other words, PDSCH resources occupied by the transport blocks may be different or the same in time domain or frequency domain. In the example of the schematic structural diagram of the slot in FIG. 2, the transport blocks transmitted on the PDSCH resources in the slots have different shapes.

The PDCCH resource in each slot is used to transmit downlink control information (DCI for short). The DC is used to indicate a PDSCH resource used to transmit the transport block of the terminal in the slot, and related control information of the PDSCH resource such as a modulation and coding scheme. Specifically, for example, in a first slot S1 in four consecutive slots shown in FIG. 2, the terminal may obtain data transmitted in a PDCCH candidate (a location at which the DCI of the terminal may appear in the PDCCH resource) from dedicated search space in a PDCCH resource. Then, the terminal successfully performs operations such as rate dematching, decoding, radio network temporary identity (RNTI for short) descrambling, and successful cyclic redundancy check (CRC for short) on the obtained data, and then determines that the data obtained from the PDCCH resource is the DCI of the terminal. The terminal parses the DCI to finally determine that the PDSCH resource that is occupied by the transport block of the terminal and that is indicated by the DCI is a PDSCH resource on a right side of a PDCCH resource in FIG. 2.

Herein, 5G NR in 3GPP TS38.214 v15.0.1 defines a scheduling manner in slot aggregation. To be specific, same symbol locations (Symbol allocation) in aggregationFactorDL consecutive slots of the downlink resources of the terminal are used to repeatedly send a same transport block (TB) by using higher layer signaling. These repeated transport blocks jointly form the PDSCH to be sent to the terminal.

Figure 3:
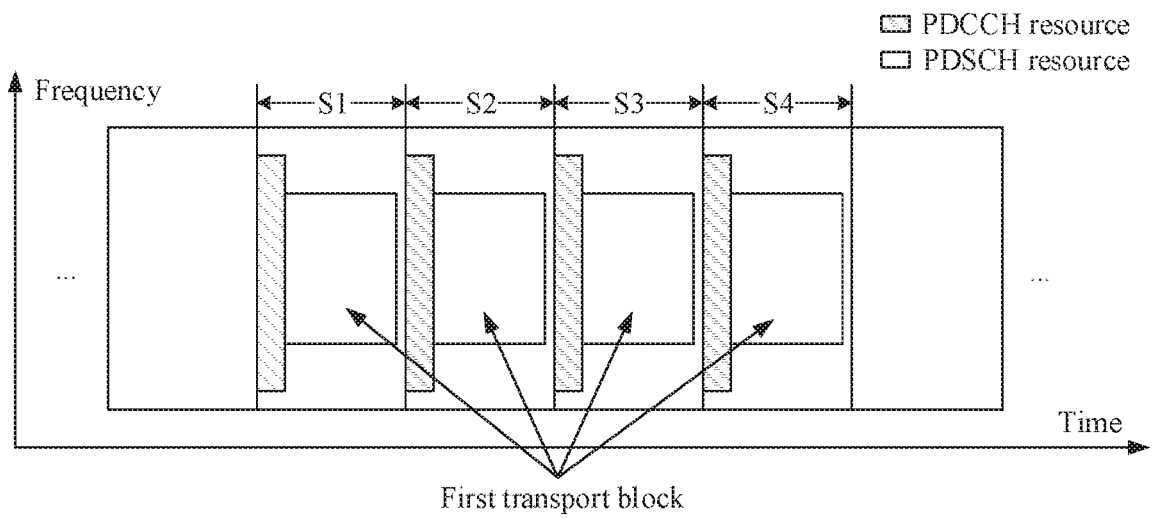
FIG. 3 is a schematic structural diagram of a transmission time unit of a terminal in a slot aggregation scenario according to this application.

Specifically, FIG. 3 is a schematic structural diagram of a transmission time unit of a terminal in a slot aggregation scenario according to this application. As shown in FIG. 3, higher layer signaling is used to indicate slot aggregation on four consecutive slots S1, S2, S3, and S4 of downlink resources of the terminal. A transport block (first transport block) of the terminal is repeatedly transmitted at same symbol locations in S1 to S4. These repeatedly transmitted transport blocks jointly form a PDSCH to be sent to the terminal. For example, in the schematic structural diagram of the slot in FIG. 3, the first transport block shown in the figure is repeatedly transmitted in the slots S1 to S4, and PDSCH resources used to transmit the first transport blocks in the slots have a same shape. It should be noted that a manner in which the first transport block shown in the figure is transmitted by using consecutive symbols as a whole is merely an example. A resource for repeatedly transmitting the first transport block in each slot may alternatively be some symbols in a plurality of symbols. Specific symbols are determined according to an actual requirement.

To improve utilization of the downlink resources of the terminal, it is further defined in the 5G NR protocol in 3GPP TS38.214v15.0.1 that a part of PDCCH resource that can be used to transmit a PDSCH is indicated to a terminal by using physical layer signaling. For example, physical layer signaling (scheduling DCI) carried on a PDCCH in a slot is used to schedule a transport block of a terminal and determine a PDSCH resource for a transport block in a first slot. In addition, the physical layer signaling further includes first indication information. The first indication information is used to indicate that a part of resource of a downlink control region (PDCCH) in a slot can be used to transmit the transport block of the terminal. Therefore, the terminal determines the PDSCH resource and the PDCCH resource in the first slot according to the physical layer signaling and the first indication information in the physical layer signaling.

Figure 4A:
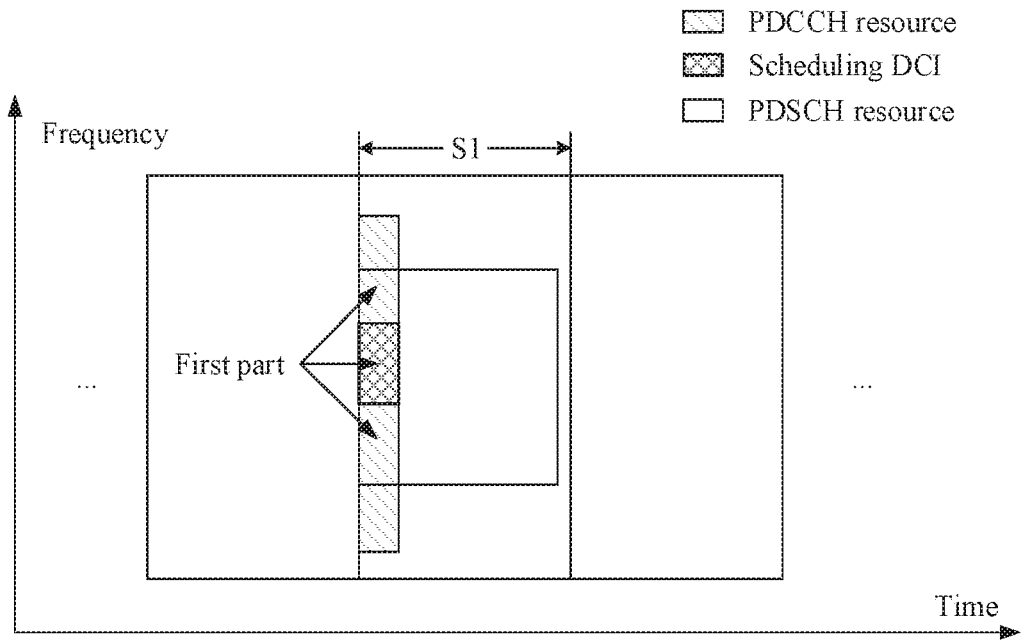
FIG. 4A is a schematic structural diagram of Embodiment 1 in which a part of resource of a downlink control region of a transmission time unit of a terminal to be used to transmit a transport block of the terminal is indicated by using first indication information according to this application.
Figure 4B:
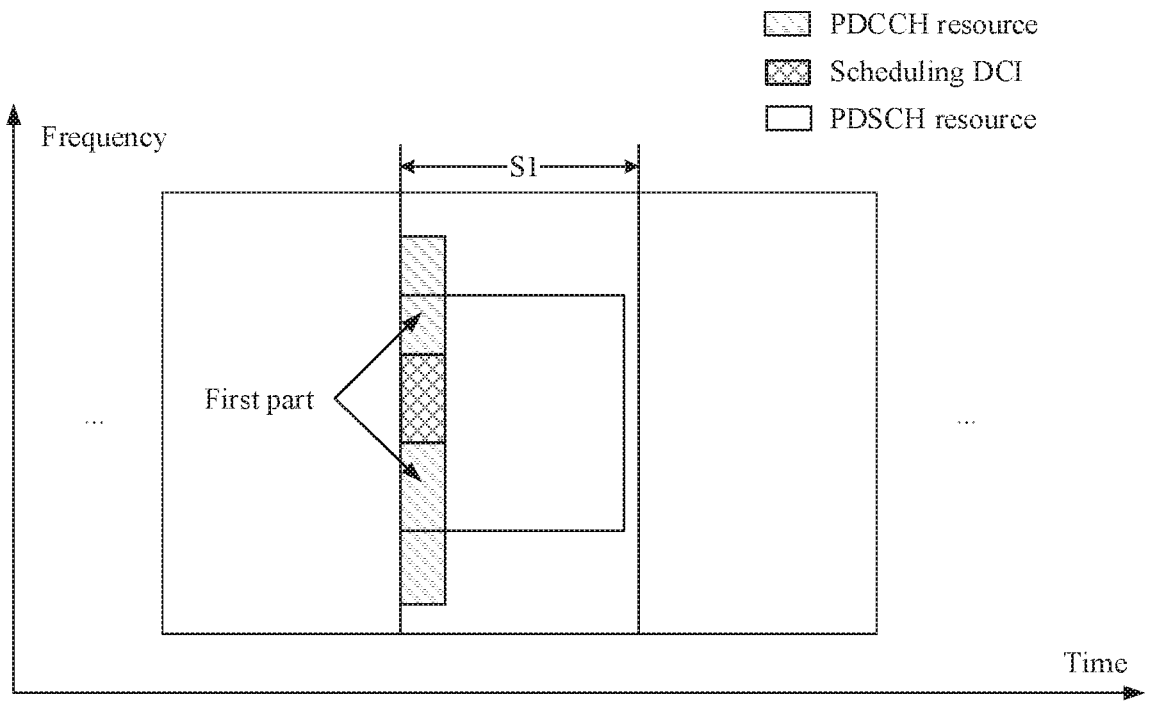
FIG. 4B is a schematic structural diagram of Embodiment 2 in which a part of resource of a downlink control region of a transmission time unit of a terminal to be used to transmit a transport block of the terminal is indicated by using first indication information according to this application.

Specifically, FIG. 4A is a schematic structural diagram of Embodiment 1 in which a part of resource of a downlink control region of a transmission time unit of a terminal to be used to transmit a transport block of the terminal is indicated by using first indication information according to this application. As shown in FIG. 4A, scheduling DC transmitted on a PDCCH resource in a slot S1 is used to indicate that the transport block of the terminal is transmitted on a PDSCH resource after an end moment of the PDCCH resource. The scheduling DCI further includes first indication information. The first indication information indicates that a part of PDCCH resource can also be used to transmit the transport block of the terminal. An understanding manner of an existing standard is shown in FIG. 4A. To be specific, in a first part of resource that is indicated by using the scheduling DCI and that is shown in the figure, because the scheduling DCI also occupies the first part of PDCCH resource, in addition to the PDCCH resource of the scheduling DCI, all other part of PDCCH resource that overlaps the first part of resource that is used to transmit the transport block of the terminal and that is indicated by using the first indication information is used to transmit a PDSCH. Therefore, the terminal determines that all other part of PDCCH resource in the first part of PDCCH resource in S except the overlapping part with the scheduling DCI is used to transmit the PDSCH. In addition, another understanding manner of the existing standard is shown in FIG. 4B. FIG. 4B is a schematic structural diagram of Embodiment 2 in which a part of resource of a downlink control region of a transmission time unit of a terminal to be used to transmit a transport block of the terminal is indicated by using first indication information according to this application. FIG. 4B shows another explanation manner of the first part in an existing protocol. To be specific, first indication information included in scheduling DCI transmitted on a PDCCH resource directly indicates that the first part shown in FIG. 4B is used to transmit the transport block of the terminal, however, a PDCCH resource for the scheduling DCI that is used to transmit the transport block of the terminal is not indicated by using the first indication information in the scheduling DCI.

However, in an existing protocol, the scheduling DCI indicating the PDCCH resource that can be used to transmit the PDSCH does not specify PDCCH resources in a slot in S consecutive slots in the slot aggregation scenario can be used to transmit the PDSCH in the slot aggregation scenario.

Figure 6:
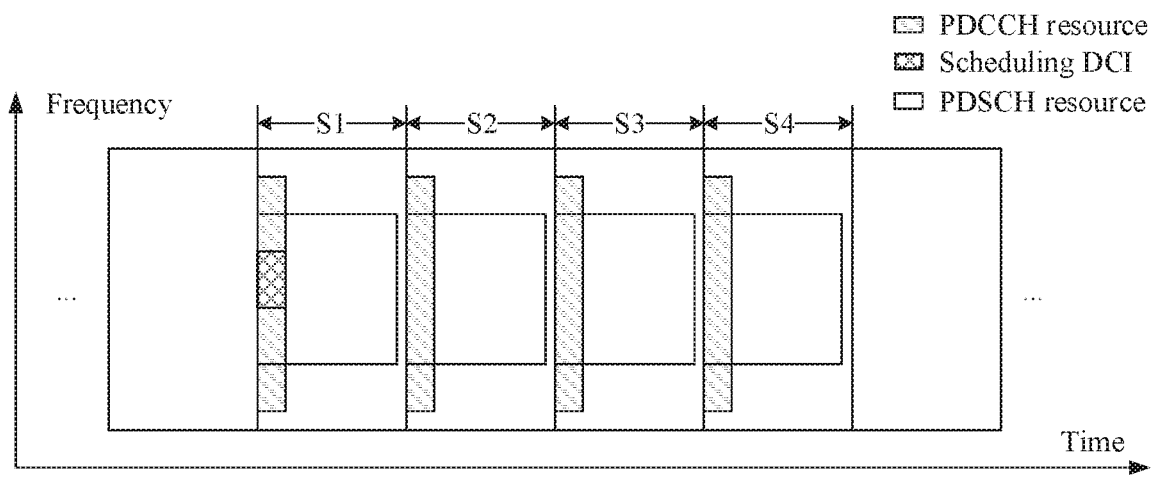
FIG. 6 is a schematic structural diagram of Embodiment 1 of a transmission time unit when a part of resource of a downlink control region to be used to transmit a transport block of a terminal is indicated to the terminal by using first indication information in a slot aggregation scenario according to this application.
Figure 7:
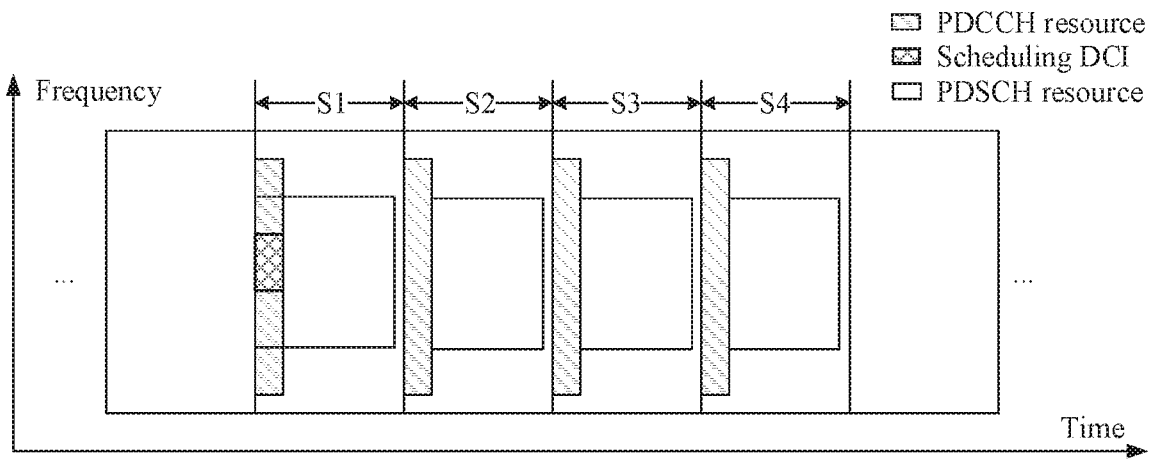
FIG. 7 is a schematic structural diagram of Embodiment 2 of a transmission time unit when a part of resource of a downlink control region to be used to transmit a transport block of a terminal is indicated to the terminal by using first indication information in a slot aggregation scenario according to this application.

For example, in the slot structure in the slot aggregation scenario shown in FIG. 2, if the PDCCH in the first slot S carries the scheduling DCI, the scheduling DCI indicates to the terminal that a part of PDCCH resource in S1 can be used to transmit the PDSCH. After the terminal obtains the DC from the PDCCH resource in S1, the terminal cannot determine whether only the part of PDCCH resource in S1 is used to transmit the PDSCH (a slot structure in this case is shown in FIG. 7) or parts of PDCCH resources in four consecutive slots S1 to S4 in the slot aggregation scenario are all used to transmit the PDSCH (a slot structure is shown in FIG. 6). FIG. 6 is a schematic structural diagram of Embodiment 1 of a transmission time unit when a part of resource of a downlink control region to be used to transmit a transport block of a terminal is indicated to the terminal by using first indication information in a slot aggregation scenario according to this application. However, the terminal usually uses parts of PDCCH resources in consecutive slots S1 to S4 in the slot aggregation scenario by default to transmit a PDSCH. However, in the slot aggregation scenario, the part of PDCCH resource that may be used to transmit the PDSCH may still be used to transmit a PDCCH in an existing solution. As a result, PDCCH transmission and PDSCH transmission are both performed on a same PDCCH resource. Because the PDCCH and the PDSCH interfere with each other, performance of a communications system is degraded. Therefore, the valid time of the first indication information is introduced in this embodiment of this application, so that use of the part of resource of the downlink control region can be determined. In this way, a probability of mutual interference between a transport block and downlink control information is reduced, thereby improving performance of a communications system.

Figure 5:
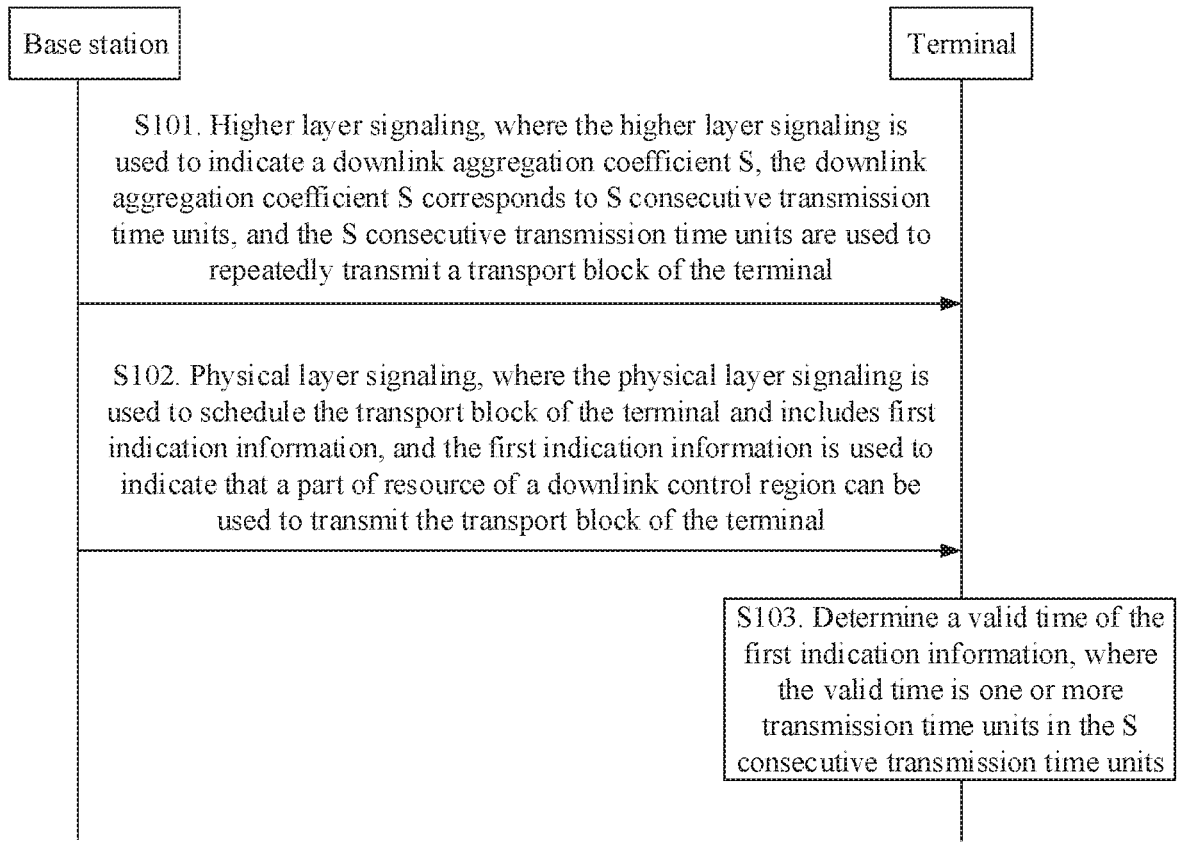
FIG. 5 is a schematic flowchart of Embodiment 1 of a wireless communication method according to this application.

Specifically, FIG. 5 is a schematic flowchart of Embodiment 1 of a wireless communication method according to this application. As shown in FIG. 5, the wireless communication method in Embodiment 1 of this application includes the following steps:

S101. Receive higher layer signaling from a base station, where the higher layer signaling is used to indicate a downlink aggregation coefficient S, S is an integer greater than 1, the downlink aggregation coefficient S corresponds to S consecutive transmission time units, and each transmission time unit is used to repeatedly transmit a transport block of a terminal.

Specifically, step S101 may be executed by the terminal. The terminal may receive, by using a wireless signal receiving module built in the terminal, the higher layer signaling sent by the base station by using an air interface. The higher layer signaling indicates the downlink aggregation coefficient S. Herein, S is an integer greater than 1. Slot aggregation is performed on the S consecutive transmission time units of downlink resources. The transmit block of the terminal is repeatedly transmitted in the S aggregated consecutive transmission time units. A size of the transmission time unit in this embodiment is one slot, and generally includes 14 symbols. Alternatively, a size of the transmission time unit is a plurality of symbols (non-slot), and may include two, four, or seven symbols. In addition, a resource that is in each transmission time unit and that is used to repeatedly transmit the transport block of the terminal may be some symbols in the slot or in the plurality of symbols (non-slot).

S102. Receive physical layer signaling from the base station, where the physical layer signaling is used to schedule the transport block of the terminal and includes first indication information, and the first indication information is used to indicate that a part of resource of a downlink control region can be used to transmit the transport block of the terminal.

Specifically, the terminal may receive, by using the wireless signal receiving module built in the terminal, the physical layer signaling sent by a network side device by using an air interface. The physical layer signaling is used to indicate that the part of resource of the downlink control region of the terminal is used to transmit the transport block of the terminal. The downlink control region may be a PDCCH resource in this embodiment. Particularly, the physical layer signaling in this embodiment may be scheduling DCI carried on a PDCCH of the terminal. In addition, the scheduling DCI may be carried by using a PDCCH resource in a first transmission time unit in the S aggregated consecutive transmission time units, or may be carried by using a PDCCH resource in a transmission time unit before the first transmission time unit. The scheduling DCI carried on the PDCCH is used to indicate, to the terminal, a time-frequency resource of the transport block of the terminal, that is, a location for transmitting a PDSCH in a transmission time unit. The scheduling DCI is used to schedule the transport block of the terminal to be transmitted on a PDSCH resource after an end moment of the PDCCH resource in the transmission time unit. The scheduling DCI further includes the first indication information. The first indication information indicates that the part of PDCCH resource can also be used to transmit the transport block of the terminal. The part of PDCCH resource that is indicated by using the first indication information in the scheduling DCI may be any first part in FIG. 4A or FIG. 4B.

S103. Determine a valid time of the first indication information, where the valid time is one or more transmission time units in the S consecutive transmission time units.

Specifically, the terminal can determine specific transmission time units in which the first indication information included in the physical layer signaling is valid, where the specific transmission time units are in the S transmission time units that are indicated by using the higher layer signaling in a slot aggregation scenario. In this way, the following case can be avoided: The part of PDCCH resource that may be used to transmit the PDSCH may still be used to transmit the PDCCH in an existing solution. In this step, to implement the foregoing purpose, the terminal determines that the one or more transmission time units in the S consecutive transmission time units in the slot aggregation scenario are the valid time of the first indication information. In other words, in the one or more transmission time units determined by the terminal, the part of resource of the downlink control region can be used to transmit the transport block of the terminal. Therefore, the terminal determines to use the part of resource that is indicated by the first indication information in the physical layer signaling, to transmit the transport block of the terminal in the one or more transmission time units in the S aggregated transmission time units. In other words, the terminal determines that the part of resource of the downlink control region in the valid time can be used to transmit the transport block of the terminal, and the part of resource of the downlink control region beyond the valid time cannot be used to transmit the transport block of the terminal.

In conclusion, in the wireless communication method provided in this embodiment, the valid time of the first indication information is introduced, so that use of the part of resource of the downlink control region can be determined. In this way, a probability of mutual interference between a transport block and downlink control information is reduced, thereby improving performance of a communications system. In addition, when the terminal specifies scheduling for the PDCCH resource by using the physical layer signaling, the base station can more accurately predict and perform subsequent scheduling for the PDCCH and the PDSCH in the downlink resources, so that the PDCCH resource subsequently used for the PDSCH resource does not affect scheduling for another terminal by the base station and other scheduling for the terminal by the base station.

Optionally, a first possible implementation of determining the valid time of the first indication information in the foregoing embodiment is that the valid time of the first indication information is a transmission time unit in the S consecutive transmission time units by default. Preferably, the valid time of the first indication information is a first transmission time unit in the S consecutive transmission time units by default. Specifically, in this embodiment, after the terminal receives the physical layer signaling including the first indication information from the base station, the terminal directly specifies that only the first transmission time unit in the S consecutive transmission time units in the slot aggregation scenario is the valid time of the first indication information. In other words, the terminal uses only the part of resource that is of the downlink control region and that is indicated by using the first indication information in the first transmission time unit, to transmit the transport block of the terminal. Optionally, the terminal in this embodiment may further determine that N transmission time units in the S consecutive transmission time units are the valid time of the first indication information. Herein, N≤S, for example, N=2, 3, or the like. In addition, the N transmission time units may be any N transmission time units or first N consecutive transmission time units in the S transmission time units. This is not limited herein.

In this embodiment, the terminal can directly determine the valid time of the first indication information according to a default valid time, instead of determining the valid time of the first indication information in the physical layer signaling according to any other condition. In this way, scheduling flexibility of a transmission time unit following the first transmission time unit in the S transmission time units is ensured, and subsequent standardization becomes relatively simple in a manner in which the terminal directly determines that the first indication information is valid in a specific quantity of transmission time units.

For example, FIG. 7 is a schematic structural diagram of Embodiment 2 of a transmission time unit when a part of resource of a downlink control region to be used to transmit a transport block of a terminal is indicated to the terminal by using first indication information in a slot aggregation scenario according to this application. FIG. 7 shows an application of this embodiment in the slot aggregation scenario. A PDCCH of a first transmission time unit S carries scheduling DCI in physical layer signaling that is used to schedule the transport block of the terminal and that includes first indication information. The first indication information included in the scheduling DCI indicates to the terminal that the part of PDCCH resource of the downlink control region in S1 is used to transmit the transport block of the terminal. After the terminal obtains the scheduling DCI from the PDCCH resource in S1, the terminal directly specifies that the first transmission time unit S1 in the S consecutive transmission time units in the slot aggregation scenario is a valid time of the first indication information, that is, the part of PDCCH resource in S1 is used to transmit the transport block of the terminal; and specifies that parts of PDCCH resources in transmission time units S2 to S4 in the slot aggregation scenario are not used to transmit the transport block of the terminal.

Optionally, a second possible implementation of determining the valid time of the first indication information in the foregoing embodiment is that the terminal determines the valid time of the first indication information according to a correspondence between the downlink aggregation coefficient S and the valid time of the first indication information. The correspondence in this embodiment may be predefined in a protocol, and may be stored in a storage module of the terminal in a table form.

Optionally, a storage apparatus in the terminal may store a table of correspondences between different Ss and valid times of the first indication information. After the terminal receives the physical layer signaling including the first indication information, the terminal determines, from the correspondence table according to the downlink aggregation coefficient S of the S consecutive transmission time units included in the slot aggregation scenario, the valid time uniquely corresponding to S. For example, in a standard, the downlink aggregation coefficient S for specified consecutive transmission time units in the slot aggregation scenario may be 2, 4, or 8, and a corresponding valid time of the first indication information may be 2, 2, or 4. In this case, the correspondence table may store, for example, correspondences S2-N2, S4-N2, and S8-N4 in a table form. Herein, N represents the valid time of the first indication information.

Figure 8:
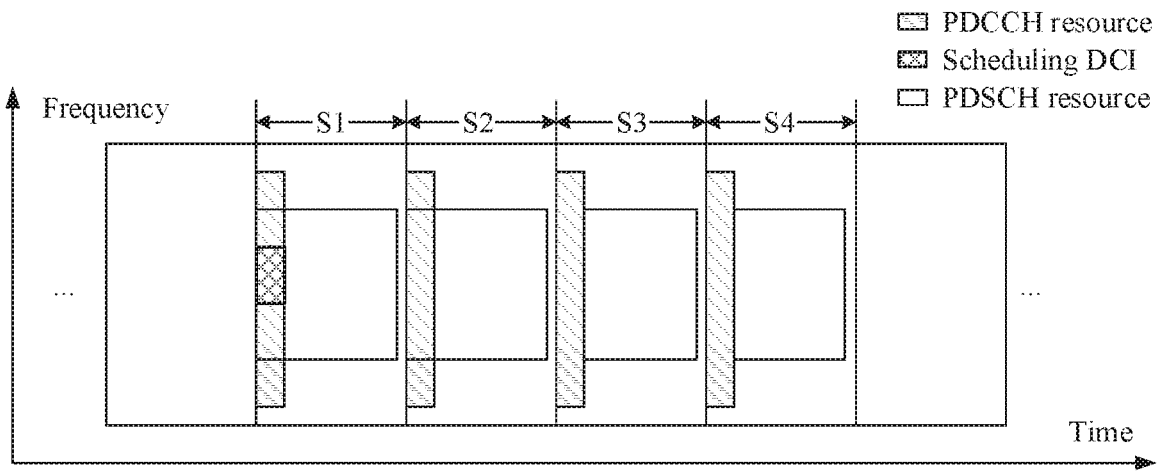
FIG. 8 is a schematic structural diagram of Embodiment 3 of a transmission time unit when a part of resource of a downlink control region to be used to transmit a transport block of a terminal is indicated to the terminal by using first indication information in a slot aggregation scenario according to this application.

For example, FIG. 8 is a schematic structural diagram of Embodiment 3 of a transmission time unit when a part of resource of a downlink control region to be used to transmit a transport block of a terminal is indicated to the terminal by using first indication information in a slot aggregation scenario according to this application. A downlink aggregation coefficient S indicated by using higher layer signaling is 4. In other words, slot aggregation relates to four consecutive transmission time units S1 to S4. When the terminal obtains, from a PDCCH of the first transmission time unit S1, scheduling DCI in the physical layer signaling that includes first indication information and that is used to schedule the transport block of the terminal, the terminal determines, according to "S4-N2" in a correspondence table, that first two transmission time units S1 in the four consecutive transmission time units in the slot aggregation scenario are the valid time of the first indication information. To be specific, the terminal determines that parts of PDCCH resources in the first two transmission time units S1 and S2 in the four transmission time units are used to transmit the transport block of the terminal, and parts of PDCCH resources in the following two transmission time units S3 and S4 in the four transmission time units are not used to transmit the transport block of the terminal.

Figure 9:
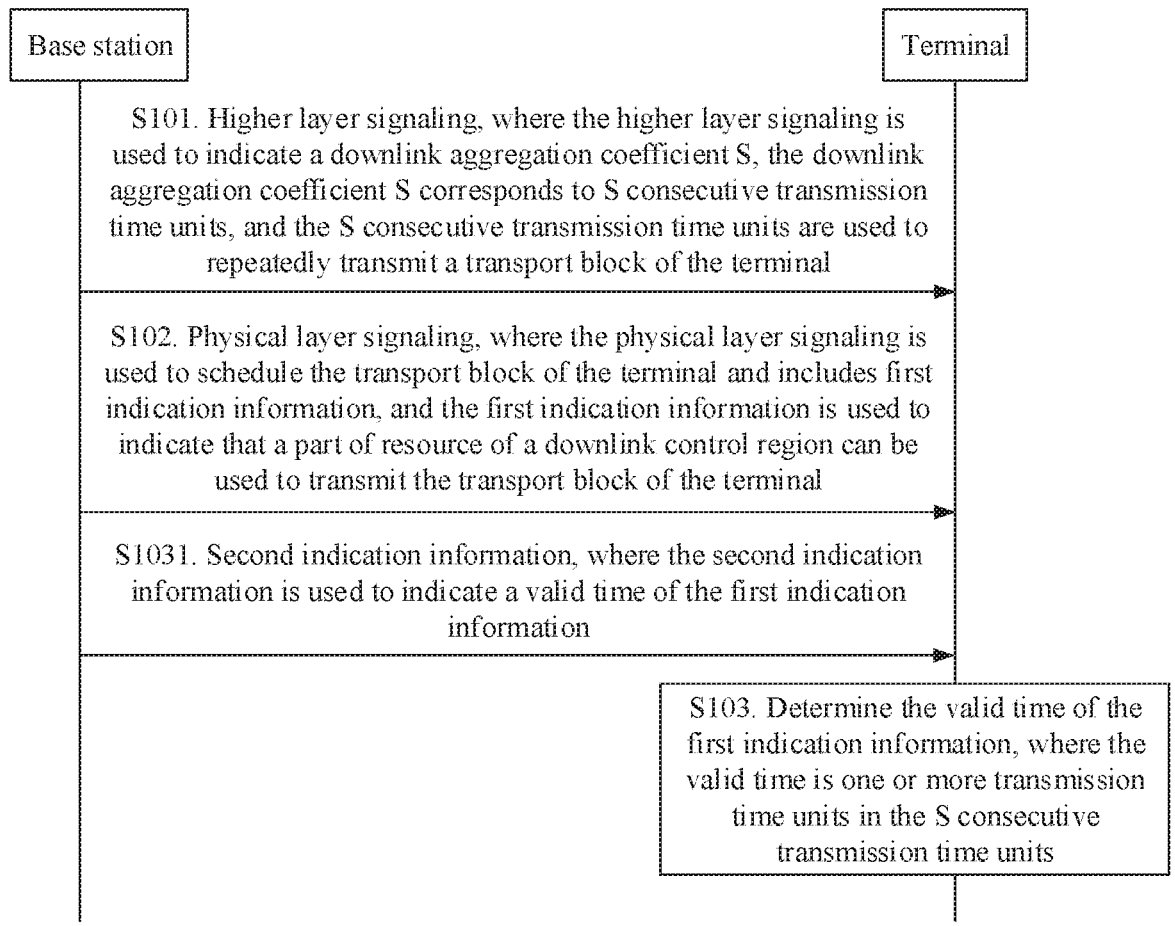
FIG. 9 is a schematic flowchart of Embodiment 2 of a wireless communication method according to this application.

Optionally, a third possible implementation of determining the valid time of the first indication information in the foregoing embodiment is that the terminal receives second indication information from the base station, where the second indication information is used to indicate the valid time of the first indication information. As shown in FIG. 9, FIG. 9 is a schematic flowchart of Embodiment 2 of a wireless communication method according to this application. Before step S103 in the foregoing embodiment, the method further includes step S1031 of receiving second indication information from the base station. The second indication information is generated in real time by a network side device according to a network load status, and then sent to the terminal by using the base station. A sending manner may be adding the second indication information to the higher layer signaling or the physical layer signaling sent to the terminal, or adding the second indication information to signaling specially used to transmit the second indication information.

A first possible implementation of step S1031 is that the second indication information is carried in the higher layer signaling, and the higher layer signaling is a configuration message of a physical downlink control channel. The higher layer signaling is PDCCH-Config. When the higher layer signaling may be PDCCH-Config, the second indication information is a higher layer parameter. Specifically, in the foregoing embodiment, the higher layer signaling used to indicate the downlink aggregation coefficient S may be PDCCH-Config. Herein, PDCCH-Config in the existing signaling includes the following parts:

```
PDCCH-Config ::= SEQUENCE {
    ......
    --Number of repetitions for data. Corresponds to L1 parameter
    'aggregation-factor-DL' (see 38.214, section FFS_Section)
    --When the field is absent the UE applies the value 1
    pdsch-AggregationFactor ENUMERATED { n2, n4, n8 }
    OPTIONAL, --
Need R
    ......
}
```

Herein, n2, n4, and n8 in pdsch-AggregationFactor are respectively used to indicate that the transport block of the terminal is repeatedly transmitted at same symbol locations in two, four, and eight consecutive transmission time units. In other words, the downlink aggregation coefficient S may be 2, 4, or 8. In this embodiment, the second indication information may be used as a higher layer parameter to be added to a location after ENUMERATED {n2, n4, n8} in pdsch-AggregationFactor of PDCCH-Config. For example, if the second indication information is that N=2, that is, the valid time of the first indication information is two transmission time units in the S consecutive transmission time units, the second indication information may be used as a higher layer parameter to be added to the higher layer signaling PDCCH-Config, to form a format such as pdsch-AggregationFactor ENUMERATED {n2, n4, n8} N=2, thereby indicating the valid time of the first indication information to the terminal by using the higher layer parameter in the higher layer signaling. It should be noted that the foregoing second indication information "N=2" and the setting manner of adding "N=2" to a higher layer signaling sentence are merely examples. Another form of same targets, for example, modifying "N{2}" and "Num{2}" is not specifically limited.

In this embodiment, because a time of applying the higher layer signaling is relatively long and the higher layer signaling carries a semi-persistent parameter, a manner in which the higher layer signaling carries the higher layer parameter to carry the second indication information is used. In this way, after the base station that generates the higher layer parameter determines the second indication information according to an average load status of the base station, the base station adds the second indication information to configuration information of the physical downlink control channel, that is, the higher layer signaling; and sends the configuration information to the terminal, so that the terminal determines the valid time of the first indication information according to the second indication information in the higher layer signaling.

Optionally, in this embodiment, other higher layer signaling may be used to carry the first parameter. The other higher layer signaling may be a configuration message in another physical downlink shard channel or another possible downlink message, such as PDSCH-Config. Specific implementation principles are the same. Details are not described herein.

A second possible implementation of step S1031 is that the second indication information is carried in the physical layer signaling, and the physical layer signaling is downlink control information. Specifically, in this embodiment, the physical layer signaling that includes the first indication information and that is used to schedule the transport block of the terminal may be scheduling DCI, and the second indication information is used as a physical layer parameter to be added to the scheduling DCI, so that the scheduling DCI carries the second indication information. For example, if the second indication information is "2", that is, the valid time of the first indication information is two transmission time units in the S consecutive transmission time units, a 2-bit data block used to transmit the second indication information may be set and reserved at any data location in the scheduling DCI, and the second indication information "2" is used as a physical layer parameter and added to the data block in a digital form in a 2-bit size.

In this embodiment, a manner in which the physical layer signaling carries the physical layer parameter to transmit the second indication information is used. Because the physical layer signaling is more flexible, the base station that generates the physical layer parameter can determine the second indication information according to a recent load status, add the second indication information in the scheduling DCI of the physical layer signaling, and send the scheduling DC to the terminal. In this way, the terminal determines the valid time of the first indication information according to the second indication information in the higher layer signaling.

A third possible implementation of step S1031 is obtaining first signaling from a network side device, where the first signaling is used to carry only the second indication information. Specifically, in this embodiment, the first signaling is specially set to transmit the second indication information, and may be generated by the network side device that generates the second indication information and then sent to the terminal by using the base station. The terminal may receive, by using a wireless signal receiving module built in the terminal, the first signaling sent by the network side device by using an air interface. The first signaling may be higher layer signaling or physical layer signaling. Preferably, the first signaling is the higher layer signaling.

Optionally, in the foregoing embodiment, a size of the transmission time unit may be one slot, and one slot includes 14 symbols. Alternatively, in the foregoing embodiment, a size of the transmission time unit is M symbols, and M is an integer greater than 1 and less than 14, or M is an integer greater than 1 and less than or equal to 14.

When the size of the transmission time unit is M symbols, determining the valid time of the first indication information in the foregoing embodiment specifically includes that the valid time of the first indication information is the S consecutive transmission time units by default. Specifically, in this embodiment, a quantity of symbols of the transmission time unit in a non-slot aggregation scenario is less than a quantity of symbols of the transmission time unit in the slot aggregation scenario. To unify valid times of different transmission time units and ensure that valid times of first indication information in different scenarios are relatively close, after the terminal receives the physical layer signaling including the first indication information from the base station, the terminal determines by default that the S consecutive transmission time units in the slot aggregation scenario are the valid time of the first indication information. In other words, the terminal uses the part of resource that is of the downlink control region in the S consecutive transmission time units and that is indicated by using the first indication information, to transmit the transport block of the terminal.

Alternatively, when the size of the transmission time unit is M symbols, determining the valid time of the first indication information in the foregoing embodiment specifically includes that the valid time of the first indication information is the S consecutive transmission time units if a value of M is less than a preset threshold. The quantity of symbols of the transmission time unit in the non-slot aggregation scenario in the protocol is defined as follows: Each transmission time unit may include 2, 4, or 7 symbols. The quantity of symbols in the transmission time unit in the slot aggregation scenario is 14. Therefore, the two application scenarios may be distinguished according to the quantity of symbols. For example, the preset threshold may be set to any quantity between 8 to 14, for example, set to 14. When the quantity of symbols in the transmission time unit is less than 14, it indicates that the S aggregated transmission time units are in the non-slot aggregation scenario. Therefore, the terminal determines that all of the S aggregated transmission time units are the valid time.

In addition, when the size of the transmission time unit is M symbols, determining the valid time of the first indication information in the foregoing embodiment specifically includes that the valid time of the first indication information is the first transmission time unit in the S consecutive transmission time units if a value of M is greater than the preset threshold or a value of M is greater than or equal to the preset threshold. After the terminal receives the physical layer signaling including the first indication information from the base station, the terminal determines that the first transmission time unit in the S consecutive transmission time units in the slot aggregation scenario is the valid time of the first indication information. In other words, the terminal uses the part of resource that is of the downlink control region in the first transmission time unit and that is indicated by using the first indication information, to transmit the transport block of the terminal. Specifically, in this embodiment, if the value of M is equal to the preset threshold, according to the operation performed when the value of M is less than the preset threshold, the terminal may determine that the valid time of the first indication information is the S transmission time units; or according to the operation performed when the value of M is greater than the preset threshold, the terminal may determine that the valid time of the first indication information is the first transmission time unit in the S transmission time units.

Optionally, in the foregoing embodiment, when the size of the transmission time units is M symbols, a possible implementation of determining the valid time of the first indication information is determining a maximum valid time K according to a correspondence between M and the maximum valid time K, where the correspondence between M and K is predefined in a protocol. Herein, the valid time of the first indication information is first min(K, S) transmission time units in the S transmission time units, and min(K, S) represents a smaller value in K and S. For K and the quantity M of symbols in the transmission time unit that have the correspondence. Ks corresponding to Ms that are sequentially arranged in ascending order progressively decrease or do not increase. Specifically, because transmission time units with different quantities of symbols have different duration, valid times in policies in units of the transmission time units are also different. In this embodiment, in order that absolute times of different transmission time units are still similar or the same when the transmission time units have different quantities of symbols, when determining N, the terminal first determines the greatest valid time K that has the correspondence with the quantity of symbols of the transmission time unit. The correspondence between K and the quantity M of symbols in the transmission time unit may be stored in the terminal in a table form. When determining K, the terminal determines K corresponding to the transmission time unit from the correspondence table. Then, K is substituted into min(K, S) to finally determine the valid time of the first indication information. For example, when quantities of symbols in transmission time units are respectively 2, 4, and 7, Ks may be respectively 8, 4, and 2. In this case, correspondences: M2-K8, M4-K4, and M7-K2 are stored in the correspondence table.

It should be noted that different possible implementations of determining the valid time of the first indication information proposed in the foregoing embodiments may appear in one apparatus or system in an "or" form. Different implementations are selected according to different application scenarios. These implementations do not contradict each other.

Figure 10:
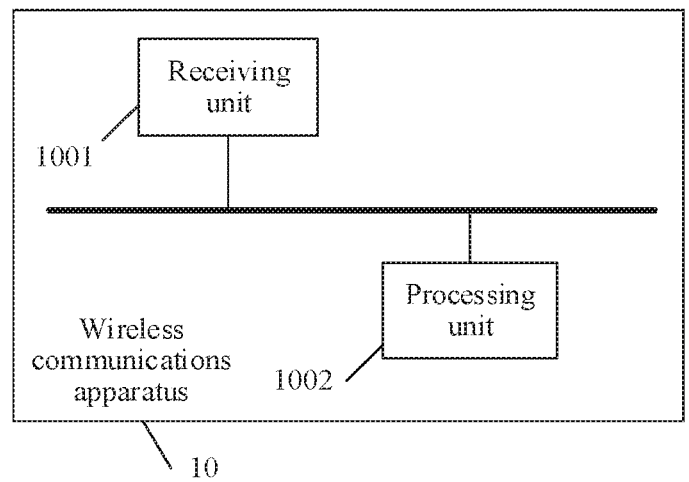
FIG. 10 is a schematic structural diagram of Embodiment 1 of a wireless communications apparatus according to this application.

FIG. 10 is a schematic structural diagram of Embodiment 1 of a wireless communications apparatus according to this application. As shown in FIG. 10, the wireless communications apparatus provided in this embodiment includes a receiving unit 1001 and a processing unit 1002. The wireless communications apparatus may be the terminal in the foregoing embodiments, or the wireless communications apparatus may be a chip or a chip set that is disposed in the terminal. The chip or the chipset may be a chip on system (SoC) chip or a baseband chip, and the baseband chip is sometimes referred to as a modem. Specifically, the receiving unit 1001 is configured to receive higher layer signaling from a base station, where the higher layer signaling is used to indicate a downlink aggregation coefficient S, S is an integer greater than 1, the downlink aggregation coefficient S corresponds to S consecutive transmission time units, and each transmission time unit is used to repeatedly transmit a transport block of a terminal. The receiving unit 1001 is further configured to receive physical layer signaling from the base station, where the physical layer signaling is used to schedule the transport block of the terminal and includes first indication information, and the first indication information is used to indicate that a part of resource of a downlink control region can be used to transmit the transport block of the terminal. The processing unit 1002 is configured to determine a valid time of the first indication information, where the valid time is one or more transmission time units in the S consecutive transmission time units. It should be understood that the receiving unit and the processing unit may be implemented by using software code, or may be implemented by using a hardware circuit, or may be implemented by using a combination of software code and a hardware circuit. For example, when the wireless communications apparatus is a terminal, the receiving unit may be a receiver or a transceiver, and the processing unit may be a processor. When the wireless communications apparatus is a chip or a chip set, the receiving unit may be an input interface or an input pin of the chip, and the processing unit may be a central processing unit CPU. For another example, the receiving unit may be a segment of program code used to implement a receiving function, and the processing unit may be another segment of program code used to implement a processing function.

The apparatus provided in this embodiment is configured to execute the wireless communication method recorded in the foregoing embodiments. Their implementations and principles are the same, and details are not described again.

Optionally, in the foregoing embodiment, the determining a valid time of the first indication information includes: determining that the valid time of the first indication information is a first transmission time unit in the S consecutive transmission time units by default.

Optionally, in the foregoing embodiment, the determining a valid time of the first indication information includes: determining the valid time of the first indication information according to a correspondence between a downlink aggregation coefficient S and the valid time of the first indication information, where the correspondence is predefined in a protocol.

Optionally, in the foregoing embodiment, the determining a valid time of the first indication information includes: receiving second indication information from the base station, where the second indication information is used to indicate the valid time of the first indication information.

Optionally, in the foregoing embodiment, the second indication information is carried in higher layer signaling, and the higher layer signaling is a configuration message of a physical downlink control channel.

Optionally, in the foregoing embodiment, the second indication information is carried in physical layer signaling, and the physical layer signaling is downlink control information.

Optionally, in the foregoing embodiment, a size of the transmission time unit is one slot, and one slot includes 14 symbols.

Optionally, in the foregoing embodiment, a size of the transmission time unit is M symbols, and M is an integer greater than 1 and less than 14.

Optionally, in the foregoing embodiment, the determining a valid time of the first indication information includes: determining that the valid time of the first indication information is the S consecutive transmission time units by default.

Optionally, in the foregoing embodiment, the determining a valid time of the first indication information includes: determining that the valid time of the first indication information is the S transmission time units when a value of M is less than a preset threshold.

Optionally, in the foregoing embodiment, the determining a valid time of the first indication information includes: determining that the valid time of the first indication information is a first transmission time unit in the S transmission time units if a value of M is greater than a preset threshold.

Optionally, in the foregoing embodiment, the determining a valid time of the first indication information includes: determining a maximum valid time K according to a correspondence between M and a maximum valid time K, where the correspondence between M and K is predefined in a protocol; and the valid time of the first indication information is first min(K, S) transmission time units in the S transmission time units, where min(K, S) represents a minimum value in K and S.

The apparatus provided in this embodiment is configured to execute the wireless communication method recorded in the foregoing embodiment. Their implementations and principles are the same, and details are not described again.

Figure 11:
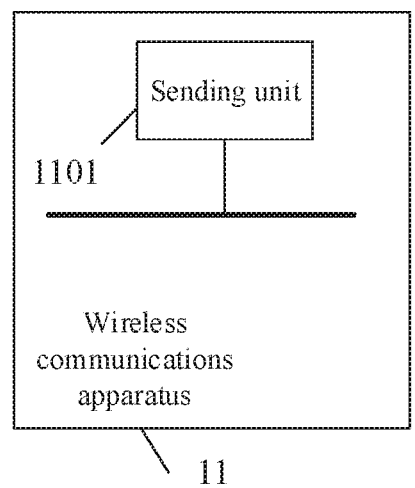
FIG. 11 is a schematic structural diagram of Embodiment 2 of a wireless communications apparatus according to this application.

FIG. 11 is a schematic structural diagram of Embodiment 2 of a wireless communications apparatus according to this application. As shown in FIG. 11, the wireless communications apparatus provided in this embodiment includes a sending unit 1101. The wireless communications apparatus may be the base station in the foregoing embodiments. Specifically, the sending unit 1101 is configured to send higher layer signaling to a terminal, where the higher layer signaling is used to indicate a downlink aggregation coefficient S. S is an integer greater than 1, the downlink aggregation coefficient S corresponds to S consecutive transmission time units, and each transmission time unit is used to repeatedly transmit a transport block of the terminal. The sending unit 1101 is further configured to send physical layer signaling to the terminal, where the physical layer signaling is used to schedule a transport block of the terminal and includes first indication information, and the first indication information is used to indicate that a part of resource of a downlink control region can be used to transmit the transport block of the terminal. The sending unit 1101 is further configured to send second indication information to the terminal, where the second indication information is used to indicate a valid time of the first indication information, and the valid time is one or more transmission time units in the S consecutive transmission time units.

The apparatus provided in this embodiment is configured to execute the wireless communication method recorded in the foregoing embodiment. Their implementations and principles are the same, and details are not described again.

Optionally, in the foregoing embodiment, the second indication information is carried in higher layer signaling, and the higher layer signaling is a configuration message of a physical downlink control channel.

Optionally, in the foregoing embodiment, the second indication information is carried in physical layer signaling, and the physical layer signaling is downlink control information.

Optionally, in the foregoing embodiment, a size of the transmission time unit is one slot, and one slot includes 14 symbols.

Optionally, in the foregoing embodiment, a size of the transmission time unit is M symbols, and M is an integer greater than 1 and less than 14.

The apparatus provided in this embodiment is configured to execute the wireless communication method recorded in the foregoing embodiment. Their implementations and principles are the same, and details are not described again.

This application provides a wireless communications apparatus, including a memory, a processor, and a computer program that is stored in the memory and that can be run on the processor. When the processor runs the computer program, the wireless communications apparatus is enabled to perform the method in any one of the foregoing embodiments.

This application provides a computer-readable storage medium. The computer-readable storage medium stores program code. When the program code is executed by a processor, any method in any one of the foregoing embodiments is implemented.

This application provides a computer program product. When program code included in the computer program product is executed by a processor, the method in any one of the foregoing embodiments is implemented.

This application provides a wireless communications system, including any terminal in any one of the foregoing embodiments and the base station in any one of the foregoing embodiments.

A person of ordinary skill in the art may understand that all or some of the steps in the foregoing method embodiments may be implemented by program instruction related hardware. The program may be stored in a computer-readable storage medium. When the program is executed, the steps in the foregoing method embodiments are performed. The foregoing storage media include: any medium that can store program code, such as a ROM, a RAM, a magnetic disk, or an optical disc.

Finally, it should be noted that the foregoing embodiments are merely intended to describe technical solutions of the present application, but not for limiting the present application. Although the present application is described in detail with reference to the foregoing embodiments, a person of ordinary skill in the art should understand that the technical solutions described in the foregoing embodiments may still be modified, or some or all of the technical features thereof may be equivalently replaced. These modifications or replacements do not make the essence of the corresponding technical solutions depart from the scope of the technical solutions of the embodiments of the present application.

What is claimed is:

1. An apparatus, comprising:
a receiver;
at least one processor; and
a non-transitory computer-readable storage medium coupled to the at least one processor and storing programming instructions for execution by the at least one processor, the programming instructions instruct the at least one processor to:
cause the receiver to:
receive higher layer signaling from a base station, wherein the higher layer signaling indicates a downlink aggregation coefficient corresponding to S consecutive transmission time units, wherein S is an integer greater than 1, and wherein a transport block is repeatedly transmitted at each of the S consecutive transmission time units; and
receive physical layer signaling from the base station, wherein the physical layer signaling schedules the transport block and comprises first indication information indicating at least a portion of resource of a downlink control region available for transmitting the transport block; and
determine a valid time of the first indication information, wherein the valid time is one or more transmission time units in the S consecutive transmission time units.

2. The apparatus according to claim 1, wherein the valid time of the first indication information is by default, a first transmission time unit in the S consecutive transmission time units.

3. The apparatus according to claim 1, wherein the valid time of the first indication information is determined according to a correspondence between the downlink aggregation coefficient and the valid time of the first indication information, wherein the correspondence is predefined in a communications protocol.

4. The apparatus according to claim 1, wherein the programming instructions further instruct the at least one processor to:
cause the receiver to receive second indication information from the base station, wherein the second indication information indicates the valid time of the first indication information.

5. The apparatus according to claim 4, wherein the second indication information is carried in the higher layer signaling, and the higher layer signaling is a configuration message of a physical downlink control channel.

6. The apparatus according to claim 4, wherein the second indication information is carried in the physical layer signaling, and the physical layer signaling is downlink control information.

7. The apparatus according to claim 1, wherein a size of a transmission time unit of the S consecutive transmission time units is one slot that comprises 14 symbols.

8. The apparatus according to claim 1, wherein a size of a transmission time unit of the S consecutive transmission time units is greater than 1 symbol and less than or equal to 14 symbols.

9. A communication method, comprising:
receiving higher layer signaling from a base station, wherein the higher layer signaling indicates a downlink aggregation coefficient corresponding to S consecutive transmission time units, wherein S is an integer greater than 1, and wherein a transport block is repeatedly transmitted at each of the S consecutive transmission time units;

receiving physical layer signaling from the base station, wherein the physical layer signaling schedules the transport block and comprises first indication information indicating at least a portion of resource of a downlink control region available for transmitting the transport block; and determining a valid time of the first indication information, wherein the valid time is one or more transmission time units in the S consecutive transmission time units.

10. The method according to claim 9, wherein the determining a valid time of the first indication information comprises:

determining that the valid time of the first indication information is by default, a first transmission time unit in the S consecutive transmission time units.

11. The method according to claim 9, wherein the determining a valid time of the first indication information comprises:

determining the valid time of the first indication information according to a correspondence between the downlink aggregation coefficient and the valid time of the first indication information, wherein the correspondence is predefined in a communications protocol.

12. The method according to claim 9, wherein the determining a valid time of the first indication information comprises:

receiving second indication information from the base station, wherein the second indication information indicates the valid time of the first indication information.

13. The method according to claim 12, wherein the second indication information is carried in the higher layer signaling, and the higher layer signaling is a configuration message of a physical downlink control channel.

14. The method according to claim 12, wherein the second indication information is carried in the physical layer signaling, and the physical layer signaling is downlink control information.

15. The method according to claim 9, wherein a size of a transmission time unit of the S consecutive transmission time units is one slot that comprises 14 symbols.

16. The method according to claim 9, wherein a size of a transmission time unit of the S consecutive transmission time units is greater than 1 symbol and less than or equal to 14 symbols.

17. A non-transitory computer-readable storage medium storing one or more instructions executable by at least one processor to perform operations comprising:

receiving higher layer signaling from a base station, wherein the higher layer signaling indicates a downlink aggregation coefficient corresponding to S consecutive transmission time units, wherein S is an integer greater than 1, and wherein a transport block is repeatedly transmitted at each of the S consecutive transmission time units;

receiving physical layer signaling from the base station, wherein the physical layer signaling schedules the transport block and comprises first indication information indicating at least a portion of resource of a downlink control region available for transmitting the transport block; and determining a valid time of the first indication information, wherein the valid time is one or more transmission time units in the S consecutive transmission time units.

18. The non-transitory computer-readable storage medium according to claim 17, wherein the valid time of the first indication information is by default, a first transmission time unit in the S consecutive transmission time units.

19. The non-transitory computer-readable storage medium according to claim 17, wherein the valid time of the first indication information is determined according to a correspondence between the downlink aggregation coefficient and the valid time of the first indication information, wherein the correspondence is predefined in a communications protocol.

20. The non-transitory computer-readable storage medium according to claim 17, the operations further comprising:

receiving second indication information from the base station, wherein the second indication information indicates the valid time of the first indication information.

* * * * *